2,795,256
BREAD CRUMBLING DEVICE

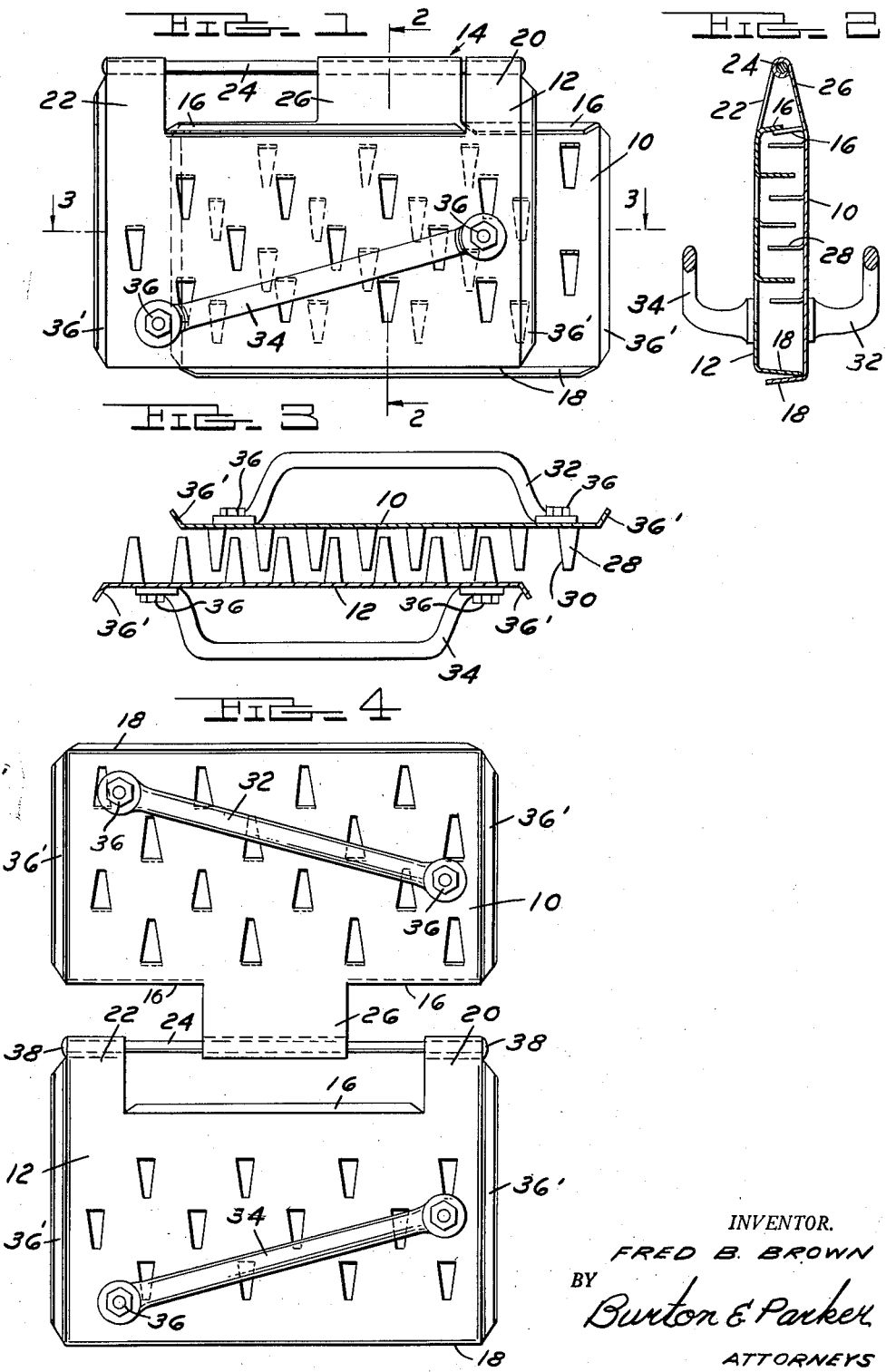

Fred B. Brown, Detroit, Mich.

Application March 21, 1956, Serial No. 572,961

6 Claims. (Cl. 146—203)

This invention relates to devices for crumbling bread, crackers, or the like, for use in the preparation of foods.

An object of my invention is the provision of a device of simple, inexpensive, and fool-proof construction which is easily operable and extremely effective in the crumbling of bread or the like.

Another object of my invention is the provision of a device of the character mentioned which is manually operable and grasped by the hands of the operator who, upon moving his hands relative to each other while grasping the device, effects the crumbling action.

Another object of my invention is the provision in a device of the character mentioned of a pair of opposed hingedly connected relatively longitudinally shiftable crumbling plates each exhibiting a plurality of teeth projecting toward the opposed plate, with the teeth of the two plates cooperating to crumble bread disposed between the plates when the plates are longitudinally shifted. A concomitant object resides in the hinged connection of the plates whereby they may be opened to grasp or receive a large chunk of bread and thereafter closed to grasp and hold the bread during the crumbling operation.

A further object of my invention is the provision of a device for crumbling bread or the like and which will accomplish the crumbling operation in a substantially lesser period of time than conventional methods of crumbling bread.

Other objects, advantages, and meritorious features will more fully appear from the specification, claims, and accompanying drawings, wherein:

Fig. 1 is a side view of a bread-crumbling device embodying my invention;

Fig. 2 is a cross sectional view taken on the line 2—2 of Fig. 1;

Fig. 3 is a cross sectional view taken on the line 3—3 of Fig. 1; and

Fig. 4 is a top view of the bread-crumbling device shown in Fig. 1 when the same is in the fully opened position.

In carrying out the objects of my invention I have provided, in the illustrative embodiment of the invention shown in the drawings, a pair of generally rectangular plates 10 and 12 which may be formed of sheet metal, such as stainless steel or the like, or any other suitable material, and which plates are hingedly connected together as at 14 for swingable movement relative to each other and for shiftable movement along the axis of swingable movement. Opposite margins of the plates extending along the major dimension of the plates are provided with flanges 16 and 18 which extend laterally of the planes of the plates. The flanges 18 along the lower edges of the plates are disposed to overlap one another when the plates are in the closed position as shown in Fig. 2. The flange 18 of plate 12 is adapted to abut plate 10 immediately above its flange 18 to space the plates apart when in the closed position.

The plate 12 is provided along that margin having the flange 16 with a pair of spaced-apart, outwardly projecting ears 20 and 22. A hinge rod or pin 24 extends between the ears and is connected to plate 12 by the ears. The rod 24 extends parallel to the major dimension of plate 12. Plate 10 is provided along that margin having the flange 16 with a centrally disposed hinge link portion 26 which encircles rod or pin 24 to hingedly connect the plates together for swingable movement and for shiftable movement along the axis of rod 24.

Each of the plates is provided with a plurality of teeth 28 which project toward each other when the plates are disposed in the closed position. Each tooth 28 is preferably formed by punching the same out of its respective plate. It will be noted that each tooth is generally triangularly shaped. Each tooth lies in a plane parallel to the planes of the other teeth, with the teeth aligned in rows and the planes of the teeth of their respective rows being disposed substantially parallel to the axis of rod 24. With the planes of the teeth so disposed, shiftable movement of the plates relative to each other along the axis of rod 24 serves to move the cutting edges 30 of the teeth through a chunk of bread or the like which may be disposed between the plates to effect a cutting action or rending action on the bread.

A pair of handles 32 and 34 are connected to the plates and extend angularly thereacross as shown in Figs. 1 and 4. They may be secured to the plates in any convenient fashion, as, for example, by bolts or the like 36.

In the operation of my bread-crumbling device to crumble bread, the operator first places a quantity of bread in a large pan, such as the lower half of a roasting pan. The bread may be torn into large chunks by the operator at the time that it is placed in the pan. Thereafter the operator grasps the handles 32 and 34 of my bread crumbling device such that when the plates are in the closed position, the hinge rod 24 is at the top and the flanges 18 are at the bottom. The operator moves device down over the chunks of bread in the pan with the plates open and closes the plates upon a quantity of the bread to grasp the same between the plates. With the bread grasped between the plates the operator lifts the device away from the bottom of the pan carrying the bread between the plates with it, and shifts the plates rapidly longitudinally of each other and along the axis of hinge rod 24, while urging the plates together whereby the cutting edges 30 of the teeth 28 are forced through the bread to effect a rending or crumbling action thereupon. The small pieces of bread torn from the larger chunks by the crumbling action fall out of the device between the open ends thereof and drop into the pan. When all of the bread between the plates has been crumbled and has fallen into the pan the operator may repeat the operation, with the number of times that the operation is repeated determining the fineness of the crumbled bread. My improved device is effective to crumble an entire loaf of bread to a fineness satisfactory for dressing or stuffing in the space of a minute or two. An entire loaf of bread may be crumbled to a very substantial fineness if the operation above described is repeated for a period of three to five minutes. In any case the period of time required to crumble an entire loaf is substantially less than that required by the prior practices.

It will be noted that the flange 18 of plate 12 prevents the points of the teeth from scraping across the opposed plate and becoming engaged within the holes formed by the punched-out teeth. It will also be noted that the ears 20 and 22, as well as the hinge link portion 26, are bent inwardly such that they cooperably space the margins of the plates at the flanges 16 apart to prevent the teeth adjacent such margins from scraping the opposed plate and becoming inter-engaged within the holes formed by the punched-out teeth. The flanges 16 and 18 also serve to prevent the chunk of bread from falling out of the device prior to its being completely crumbled.

Following use of the device it may be readily cleaned by simply slamming the plates together and effecting rapid relative longitudinal shifting of the plates. Such action will loosen any bread crumbs adhering to the plates and cause them to fall therefrom.

If desired, those margins of the plate paralleling the minor dimension of the plates may be provided with flanges 36'. Such flanges will serve to reinforce the plates and also eliminate sharp edges extending in the planes of the plates. The hinge rod 24 may be peened at opposite ends as at 38 to retain the same within the ears 20 and 22.

While I have shown one embodiment of my invention, it will be apparent to those skilled in the art that other forms of the invention may be devised without departing from the spirit of the invention as herein disclosed, and I do not wish or intend to limit myself other than as hereinafter defined by the following claims.

What I claim is:

1. A bread-crumbling device comprising: a pair of plates, hinge means swingably connecting the plates together for movement between an open position wherein the plates are angularly disposed with respect to each other and a closed position wherein the plates are disposed in substantially parallel relation, said hinge means including a pivot rod secured to one of the plates and a hinge link portion encircling the rod and secured to the other plate and swingable about the rod and shiftable longitudinally of the rod, whereby the plates are both swingable relative to each other and shiftable along the axis of the rod, each plate provided with a plurality of teeth projecting toward the opposed plate when the plates are in a closed position, and handle means on each plate to permit grasping of the plates by an operator.

2. A bread-crumbling device comprising: a pair of plates, one of said plates provided at one marginal edge with a pair of ears spaced apart along the edge, a hinge rod extending between and carried by the ears, the other plate provided at an edge complementing the said edge of the first plate with a projecting hinge link portion slidably encircling the rod to swingably and slidably connect the plates, said hinge link portion shiftable along the rod between the ears to permit shifting of the plates in their own planes relative to each other, each plate provided with a plurality of teeth projecting toward the opposed plate when the plates are in a closed position, and handle means on each plate to permit grasping of the plates by an operator.

3. A bread-crumbling device comprising: a pair of plates, one of said plates provided at a marginal edge with a pair of integral spaced-apart ears, a hinge rod secured to and extending between said ears, the other of said plates provided at a marginal edge complementing said marginal edge of the first-mentioned plate with an integral hinge link portion swingably connected to the rod and shiftable axially along the rod whereby the plates are hingedly connected together and are shiftable relative to each other along the axis of said hinge rod, each plate provided with a plurality of laterally projecting integral spaced-apart teeth extending toward the opposed plate when the plates are swung to a closed position, and handle means on each plate whereby an operator may readily grasp the plates for swingable movement and shiftable movement along the axis of said rod.

4. The invention as defined in claim numbered 3 characterized in that the teeth of each plate lie in planes substantially parallel to the axis of said hinge rod.

5. A bread-crumbling device comprising: a pair of plates, means connecting the plates for swingable movement about an axis extending parallel to a major dimension of the plates and for shiftable movement along such axis, those marginal edges of each plate extending parallel to the major dimension of the plates being provided with flanges projecting toward the opposed plate when the plates are swung to a closed position of parallelism with the flanges holding the plates in determined spaced-apart relation, a plurality of teeth for each plate projecting toward the opposed plate when the plates are in said closed position, said teeth arranged such that the plates may be shifted relative to each other along the major dimension of the plates, and handle means on each plate to facilitate said swingable and shiftable movements by an operator.

6. The invention as defined in claim numbered 5 characterized in that said plates are of sheet metal and the teeth are integral with the plates and define rows extending parallel to said axis, each tooth having a generally pointed end and lying in a plane parallel to the planes of said flanges on its respective plate.

References Cited in the file of this patent

UNITED STATES PATENTS

| | | |
|---|---|---|
| 1,016,338 | Lannoye | Feb. 6, 1912 |
| 1,834,717 | Knapp | Dec. 1, 1931 |